Feb. 17, 1953          J. J. HORAN          2,628,910
METHODS AND DEVICES FOR MERCHANDISING
AND DISPENSING LIQUID INFANT FOOD
Filed Sept. 5, 1947

INVENTOR.
John J. Horan

Patented Feb. 17, 1953

2,628,910

UNITED STATES PATENT OFFICE 2,628,910

METHODS AND DEVICES FOR MERCHANDISING AND DISPENSING LIQUID INFANT FOOD

John J. Horan, Detroit, Mich.

Application September 5, 1947, Serial No. 772,236

17 Claims. (Cl. 99—171)

1

This invention relates to methods for canning liquid infant food and to metal cans upon which this method is employed.

Under the prior art there was formerly no means by which liquid infant food could be loaded, preserved and packaged by commercial processors for subsequent use in feeding infants directly from the original container.

It was usually necessary for persons, desiring to administer sterile food to infants, to mix one of various milk preparations, in the forms of powders, liquids or pastes, with water and other ingredients or to use raw milk, and to sterilize nursing bottles, caps, nipples, mixing apparatus, water, and sometimes the food, all tedious and messy chores and, in inexpert hands, tasks accompanied by uncertain safety.

Packages in accordance with my invention comprise generally an outer protective covering enclosing a tubular can body, hereinafter usually termed container, the container being closed at one end by an orthodox type of closure, the container enclosing a supply of liquid infant food, the container being closed at its open end by a special closure of novel design and function and having a nipple, the nipple being protected externally by a detachable sealed element.

The containers hold liquid infant food, in concentration and amount generally suitable for single direct feedings therefrom. The several elements of the packages are intended to be thrown away after use. Containers, food, closures, and outer protective coverings are adapted to be loaded, assembled, sealed, packaged, and shipped by canneries or dairies and may be delivered by such channels as are now used for evaporated and condensed milk and even for raw milk.

The containers are generally of cylindrical sheet metal construction, each having a conventional soldered or seamed closure at one end and a double closure at the opposite end, one element of this double closure having a nipple, the other element being generally external to the nipple, and being sealed in such a manner that the nipple and contents are shielded against contamination and spoilage.

The completed and loaded containers are enclosed within protective coverings to insure against contamination by handling, since they eventually will be handled by infants.

The person administering to the infant need only remove the exterior protective covering and the outer closing element, leaving the container and the nipple exposed. After the container has

2 been warmed, an operation which may precede the removal of the outer closure, the container becomes ready for feeding and will be discarded when drained. A vent is provided for relief of suction while the contents are being withdrawn by suckling. Mixing or compounding of the food and sterilizing of the food, nipple, etc. is rendered unnecessary.

An object of this invention is to provide packages containing small compact light weight metal dispensing cans at low cost, the cans to take the place of heavy cumbersome orthodox types of nursing bottles, the cans being suitable for assembly and loading with liquid infant food on canning machinery, and for marketing through normal commercial food channels.

An object of this invention is to provide sealed metal containers having liquid infant food therein, which need not be kept refrigerated to prevent the food from spoiling.

Further objects and novel features will become apparent in the balance of the specification, in the claims appended and in the following description of the drawings in which:

Figure 1:
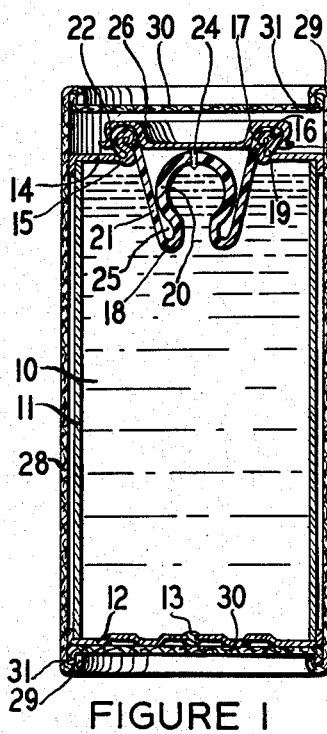
Fig. 1 is a cross sectional drawing in which is illustrated one form of a package in accordance with my invention, including an outer covering, a container and special closure therefor.

Referring now to Fig. 1, there is illustrated a metal can, the body 11 and base 12 of which are similar in construction to cans used for loading evaporated milk. The base 12 has a small centrally located opening, sealed, after the can has been loaded with liquid infant food 10 and while it is still inverted, with a drop 13 of low melting point sealant.

The periphery 14 of the inner element 15 of the special closure is secured in conventional fashion to the body 11.

The central portion of the inner element 15 is formed into a comparatively rigid seat 16 over which the skirt 17 of a nipple 18 is placed. The outer rim 19 of the nipple 18 is permanently secured to the element 15 by a dieing operation which squeezes the rim 19 between the seat 16 and the parent metal adjacent the seat 16.

The nipple 18 is partly folded to bring the ball 20 within the walls 21, in order to reduce the overall height of the assembly.

The closure element 22, hereinafter called the cap 22, which protects the nipple 18 and contents 10 during shipping and handling, is adapted to use the nipple flange 17 as a gasket.

To demonstrate the fact that a choice of sealing surfaces is available, the cap 22 has been shown reentrant. This would permit the point of squeeze of the nipple skirt 17 to be against the top of the seat 16, or against either the inside or outside wall of the seat 16, or the squeeze may be evenly distributed if desired.

Because of the resilience of the metallic seat 16 and the cap 22 and the flexibility of the nipple skirt 17 which serves as a gasket, the type of construction illustrated permits use of negative draft on the walls of the cap 22 if desired, providing a gripping closure which renders unnecessary any dependence on negative internal pressure for a seal. The right side of the illustration shows the rolled edge 23 indented, as it would be by a horizontal "stab" die, providing another optional means of insuring against accidental removal and pulling the cap 22 down tightly for sealing at the upper edge.

The double closure assembly thus described may be completed before it is mounted upon the can body. A small pin 24 is soldered, spotwelded or otherwise secured to the center of the cap 22. The pin 24 is adapted to pierce the nipple ball 20 at assembly and has a reduced diameter shank which remains gripped by the sides of the feeding orifice of the nipple ball 20.

One form of outer protective covering, a multiplicity of forms being possible, is illustrated. It utilizes a cylindrical tube 28, preferably made of helically wound paper such as is used for mailing tubes and artillery ammunition containers. The tube 28 and the end discs 30 are preferably impregnated with water-resistant material. The ends 29 of the tube 28 are crimped over the turned up edges 31 of the discs 30, which serve as closures for each end of the tube 28.

After the outer protective covering has been ripped off (the container, if vacuum sealed, being preferably warmed before removal of the cap 22), the cap 22 may be pried off by inserting a spoon handle or the back of a knife blade or any similar pry tool under its rolled edge, preferably at one of the stab points 23. The vent orifice 26, which has been obturated while the cap 22 and nipple 18 are in shipping position, becomes free to perform its function as soon as the nipple 18 is extended by the pull transmitted through the pin 24 to the ball 20. While shaking of the can after removal of the cap 22 would extend the nipple 18 in any event, the pin 24 insures that the orifice will be clear and unplugged by coagulated food at the time of feeding, and further insures against flooding of the space 25 above the nipple 18 during shipping and handling prior to the time the cap 22 is removed.

Figure 2:
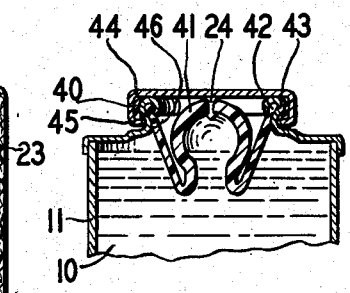
Fig. 2 is a cross sectional drawing in which is illustrated an alternative form of special closure for a container.

Referring now to Fig. 2, there is illustrated an alternative form of closure differing slightly from that shown in Fig. 1, in that the gasket 40 is a separate piece from the nipple 41.

The outer flange 42 of the nipple 41 is gripped in the upturned nipple seat 43 and terminates in the inside wall of the seat 43, instead of extending around the seat 43 as in Fig. 1. The exterior wall of the nipple seat forms a seat for a sealing gasket 40 secured in the cap 44.

Retention of the cap 44 would be insured by the pressure differential existing between the inside and the outside of the can after loading and cooling, but this is not the only means available. The elasticity of the metal in the seat 43 and in the cap 44 and the flexibility of the gasket 40 permit stress squeezing and gripping of the gasket 40 between the opposing surfaces.

Design and functioning of the pin 24 and nipple 41 otherwise resembles that of Fig. 1. The cap 44 may be removed with the back of a knife blade, a spoon handle or any similar pry tool inserted under its edge 45. The vent orifice 46, which is obturated when the cap 44 and nipple 41 are in shipping position, becomes operative as soon as the nipple 41 is extended.

Figure 3:
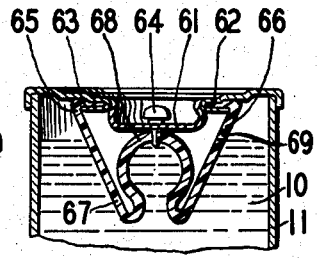
Fig. 3 is a cross sectional drawing in which is illustrated another alternative form of special closure for a container.
Figures 4, 5:
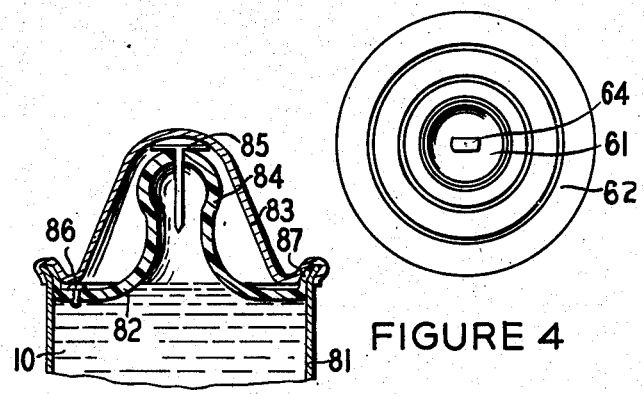
Fig. 4 is an external end view of the closure illustrated in Fig. 3.
Fig. 5 is a cross sectional illustration of another alternative form of a special closure for a container.

Referring now to Figs. 3 and 4, there is illustrated another form of closure which does not rely on a gasket, but instead upon a breakaway seal member 61. The nipple gripping closure element 62 has an inwardly turned flange 63 generally centrally located. The breakaway seal member 61 has been sealed with solder or cement around its periphery to the bend in the closure element 62 adjacent the flange 63 on the side which eventually becomes the inside surface of the closure. The breakaway seal member 61 has been fitted with a sturdy pin 64 extending through it and soldered or cemented to it. After the breakaway seal member 61 has been assembled to the closure element 62, the nipple 67 is dropped into place, the nipple flange 65 extending over and around the flange 63. A single operation with a ring die, the pressure being transmitted through the nipple skirt 66, bends the flange 63 parallel to the main surface of the closure element 62 as shown, squeezing and locking the nipple flange 65 in place, at the same time that another ring die of smaller diameter, extending through the neck of the nipple 67, permits the pin 64 acting as a punch to pierce the ball 68 of the nipple, thus forming a feeding orifice. The vent orifice 69 is in the skirt of the nipple 67.

The above operations of closure partial assembly, if done on hand fed machines, would normally be done with the inside surfaces uppermost. The closure element 62 is then secured to the container body 11.

This container, like the gasketed containers, may be filled at either end before the closure at the end is assembled; but is preferably filled after the closures are already in place as in the other forms, that is, from the base with a syringe or syrette type injector through a centrally located hole, which may then be closed with a drop of low melting point material.

The external portion of the pin 64 is a head of larger diameter with flattened sides.

By means of a table fork, used as a lever, or other lifting tool applied under the head of the pin 64, failure of the soldered or cemented seal joint may be initiated at the periphery of the breakaway seal member 61 as it becomes progressively deformed by the applied stress.

Completion of withdrawal brings the nipple 67 out to the use position, its orifice freshly opened, and leaves any roughness caused by solder or cement adhering to the bend of the closure element 62 toward the inside surface where such roughness does not come into contact with the infant's mouth.

Referring now to Fig. 5, there is shown another form of closure 82, 83 for a container filled with liquid infant food 10, the inner element 82 being preferably of transparent plastic material and having an integral nipple 84 whose feeding and venting orifices are closed by pins 85, 86. The inner element 82, of smaller maximum diameter than the outer element 83, is lightly cemented at its periphery 87 to the inner surface of the outer element 83. The outer element 83 is then placed over the end of the container 81; and a set of roll dies crimp the outer element 83 and the container 81 together permanently in place, the compressed periphery 87 of the inner element 82 serving as a gasket between the other two members.

The inner element 82 is dished inwardly a greater distance than the outer element 83, so that the common rotary type of can opener, when applied to this end of the can, will cut cleanly through the outer element 83, leaving the inner element 82 intact and burying the cutting burr into the resilient material of the inner element 82.

The nipple 84 is not shown telescoped as in the forms illustrated previously. When the nipple 84 is mounted in the manner shown here, allowance must be made in the design of the outer closure element 83 or of the container 81 and usually also of the outer protective covering (not shown) for the increased total height of the assembled elements of the package. It is, therefore, usually preferable either to telescope the nipple or to fold it to one side.

As with the forms shown previously, additaments such as vitamins, fish liver oils, minerals, etc., as prescribed by the physician, may be added by means of a pointed dropper inserted through the feeding or venting orifices. The venting orifice 86 is preferable for this purpose since it is located on the skirt near the periphery 87 where it is supported.

The pins 85, 86 abut the inner face of the outer closure 83, from which they receive some support in order to reduce the possibility of their being prematurely dislodged.

It is only necessary for the consumer to strip the outer protective covering, warm the container assembly, cut out the central portion of the outer closure element 83 with the common rotary type of can opener, and remove the pins 85, 86 before administering the food to an infant.

Figure 6:
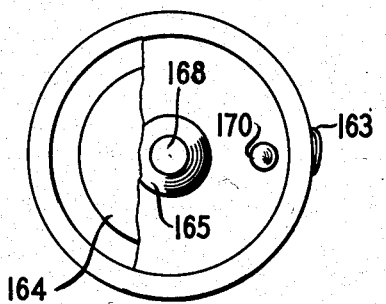
Fig. 6 is a sectional view of the can portion of another package in accordance with this invention.
Figure 7:
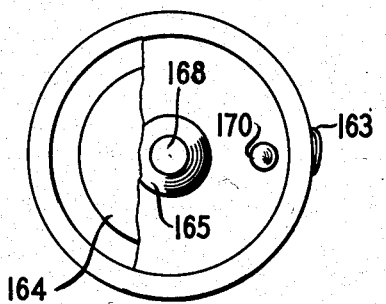
Fig. 7 is a partially cut away view of the top of the can shown in Fig. 6.

Referring now to Figs. 6 and 7, there is shown another form of a combination shipping device for liquid infant food and nursing dispenser, the container portion comprising a body 161 that preferably is made of sheet metal, its interior surface being suitably protected against chemical interaction with food, the body 161 being drawn into cylindrical form by means of dies, or alternatively being made of sheet metal cylindrically rolled and seamed. In the form shown, the bottom closure 162 is made of a separate sheet of metal seamed to the can body 161. The bottom closure 162 has an integral suspension tab 163 at its edge, the tab 163 being folded alongside the body 161 for shipment.

The container is sealed at the top by two closures 163 and 164, the inner closure 163 being dished inwardly at its periphery so that a rotary type of can opener, when applied to the top of the can by the consumer, will cut cleanly through the outer closure 164 only, leaving the inner closure 163 intact.

To aid in showing in how many different ways this invention may be applied regardless of the general type of construction to which it is adapted, I have shown a nipple 165 that is not folded in any way for shipment, and is not separate, requiring mounting by the consumer, but is actually shipped in the use position. In order to provide a nipple 165 in this position it is necessary to have considerable space between the inner and outer closures 163 and 164; said space is provided by outwardly dishing the outer closure 164. However, equally suitable construction would be provided if the nipple in shipping position were folded as shown in other forms of this invention made of different materials, or if the ball of the nipple were merely folded to one side between the closures.

The flange 166 of the nipple 165 is crimped to the central flange of the inner closure 163, a waterproof seal 167 being provided to keep the nipple dry during shipment, the said seal 167 being crimped at its periphery between the nipple flange 166 and the inner closure. A small pin 168 resembling a thumb tack, which also serves as a nipple orifice closure, is provided for puncturing the seal 167.

A small vent for vacuum relief is provided by a hole in the nipple 165 just above the flange 166.

A small plug 170, pressed into a hole in the inner closure 163, is provided for removal by the consumer for the purpose of making such additaments as may be prescribed by the infant's physican. The plug 170 may be replaced by pressure. The plug is located under the reentrant portion of the outer closure 164 to prevent the possibility of its being dislodged prematurely.

All of these metal containers are adapted to be either top or bottom filled. In each case I prefer the following sequence of operations for assembly and loading of the containers with sterile food:

Preassemble the inner and outer closure elements as a complete unit assembly; apply this unit and the base closure to opposite ends of the body, sterilize, inject the food with a syrette or hollow type fitting through the central orifice in the base closure, and seal with a hot hardenable sealant.

Sterilization of the food and the container and closure assembly may be performed separately if desired or may be undertaken after the container has been filled and closed, the closed assembly being placed in position to receive an application of heat or other form of germicidal energy.

I prefer that these closures be applied under positive pressure conditions and in a nonoxidizing gas atmosphere in order to maintain the food in the best possible condition and to force folded nipples outward upon removal of the cap, although the use of positive pressure is not absolutely necessary. Even if the containers were sealed in such a manner as to leave a rarified atmosphere within, and if no plugs or obstruction of the orifices were used, the nipple, after closure removal, could be shaken out to the use position as the vent begins to operate.

These packages fall under the single service classification in that the outer protective covering is destroyed by the opening process and the several components removed by the consumer before feeding are generally subject to damage by the removal process. The container and nipple closure further are not generally practicably capable of disassembly for scouring, cleaning and resterilization, and, if disassembled, do not take their original preassembly form.

The cost of disassembly, cleaning, repairs, inspection and reassembly is greater than the original cost of the assembled components.

While there have been shown and described what are at present considered to be the preferred forms of this invention, it will be obvious to those skilled in the art that various changes, modifications and combinations may be made therein and therewith without departing from the true scope of this invention; and it is accordingly intended in the appended claims to cover such equivalents as may fall within the true scope of this invention and without the prior art.

Therefore I claim:

1. A closing and dispensing device comprising a nipple and an external member, said external member being capable of being crimped at its perpihery adjacent the brim of a vessel, the peripheral portion of said nipple being interposed as a gasket, a portion of said external member being susbequently removable to provide feeding access to said nipple.

2. Dual closure means for a container, said means comprising an inner member permanently attached adjacent the mouth of said container and having a generally centrally located flange gripping the peripheral portion of a nipple, and a second member external to said nipple and separated from said inner member by gasket means.

3. The combination of a container having a supply of liquid infant food therein, said container having an open mouth, a nipple having a peripheral portion fitted to said container adjacent said mouth and a sealed outer closure not removable by hand from said container but priably detachable therefrom by use of a simple lever applied at a random point along the edge of said closure, a portion of said container serving as a fulcrum for said lever, said closure being liable during such detachment to deformation in such a manner that, if reapplied by hand, it is subject to malfunctioning as a sealing closure.

4. A package for shipment, storage, and direct dispensing of liquid infant food comprising a vessel, a nipple spanning the mouth of said vessel, a sealed closure external to and spanning said nipple, said vessel having therein a hole for the injection of said food, said food having been injected therethrough, said hole having been sealed after injection by the application in liquid form thereon of a small amount of hardenable sealant.

5. The combination of a flask closed at one end and a closure for the other end of said flask, said closure and said flask constituting an enclosure, a supply of liquid infant food and nursing nipple means contained within said constituted enclosure, said nipple means having radially extending therefrom a peripheral portion, said flask having been crimped inelastically at assembly into gripping engagement with said peripheral portion.

6. The combination of a comparatively rigid container closed at one end and having a rim at the other, said container having a supply of liquid infant food therein, and a nursing nipple, the said rim gripping the peripheral portion of said nipple in such a manner that the nipple is incapable of intact removal and intact reapplication by hand to said container without inelastic distortion of said container.

7. A package for commerce comprising a vessel holding therein a supply of liquid infant food, the mouth of said vessel being spanned by a nursing nipple; a closure external to and spanning said nipple and hermetically sealed over said nipple; and a pull member connecting said closure and said nipple, said pull member being adapted to be pulled free of and to unblock said nipple upon the removal of said closure.

8. A package for commerce comprising: a container holding therein a supply of liquid infant food; a nipple crimped to the upper end portion of said container; and an outer closure external to said nipple and engaging said end portion adjacent said crimp, said outer closure being hermetically sealed to said container, the central portion of said outer closure being removable when feeding access to said nipple is desired.

9. A package for commerce comprising: a container holding therein a supply of liquid infant food; a nipple secured at its periphery to the upper end portion of said container, said nipple having a venting orifice adjacent said periphery; and an outer closure external to said nipple, said outer closure being hermetically sealed to said container, the inner surface of said outer closure and a juxtaposed surface of said container coacting from both sides to close said venting orifice.

10. A package for commerce comprising: a container holding therein a supply of liquid infant food, said container having an end portion with an opening therein, said opening being closed by a nipple; and an outer closure engaging said end portion adjacent said opening, the flange of said nipple acting as a gasket between said end portion and said outer closure, said outer closure being incapable of removal by hand alone therefrom without permanent distortion of an above named component of said package.

11. A package for commerce comprising: a container holding therein a supply of liquid infant food; a crown formed on the upper end portion of said container, said crown being an integral part of the said upper end portion; a nipple, said crown having an annular crimped portion, said crimped portion gripping said nipple; and a cap crimped over the said crown, the said nipple being retained within the container prior to the removal of said cap, said nipple being adapted to emerge to feeding position through the opening created by the removal of said cap.

12. A package for commerce comprising: a container holding therein a supply of liquid infant food; a generally centrally located reversely folded annular crimp in the upper end portion of said container; a nipple having an annular flange secured in said crimp; and an external closure gripping said upper end portion at said crimp, said external closure being hermetically sealed to said container.

13. A package for commerce comprising: a container having a supply of liquid infant food therein; an inner closure spanning the mouth of said container and secured to said mouth in such a manner as to prevent replaceable disassembly therefrom by the unaided hand, said inner closure having a generally centrally located reversely crimped portion; and a nipple having an annular flange secured in said crimped portion, said outer closure having a peripheral skirt portion exerting gripping force on said reversely crimped portion, said closure and said container forming in cooperation a hermetically sealed compartment.

14. A package for commerce comprising: a flask having a supply of liquid infant food therein; an inner closure spanning the mouth of said flask and having an aperture therein; a nipple closing said aperture; and an outer closure for said flask, said outer closure being not detachable by hand alone from said flask but priably detachable therefrom by means of an extraneous tool, such as a lever, applied to a random point on the lower periphery of said outer closure.

15. A package for commerce comprising: a body portion having a supply of liquid infant food therein; an inner closure spanning the mouth of said body portion and secured inelastically to said body portion adjacent said mouth; said inner closure having a nipple gripped in a generally central flange; and an outer closure external to said nipple and inelastically secured to said inner closure.

16. A package as in claim 11, said nipple having an orifice therein and an element affixed thereto, said element forming in conjunction with said nipple a temporary seal for preventing said food from initially passing into the space between said nipple and said cap, said element being removable from said nipple when said package has been opened.

17. A package for commerce comprising: a container holding therein a supply of liquid infant food; a crown formed on the upper end portion of said container, said crown being an integral part of the said upper end portion; a circumferential groove formed within the said crown; a nipple having an annular flange secured in said groove; and a cap crimped over the said crown and incapable of being removed by hand alone therefrom without distortion of said cap, the said cap being removable by use of an extraneous tool, the said nipple being retained within the container before the cap is removed and adapted to emerge through the opening created by the removal of said cap.

JOHN J. HORAN.

REFERENCES CITED

The following references are of record in the file of this patent:

UNITED STATES PATENTS

| Number | Name | Date |
| --- | --- | --- |
| 609,415 | Coulbourn et al. | Aug. 23, 1898 |
| 1,344,760 | Goddard | June 29, 1920 |
| 1,866,036 | Hartman et al. | July 5, 1932 |
| 2,090,749 | Corsi et al. | Aug. 24, 1937 |
| 2,093,130 | Kurkjian | Sept. 14, 1937 |
| 2,108,114 | Foard | Feb. 15, 1938 |
| 2,158,837 | Schukraft | May 16, 1939 |
| 2,298,545 | Waters | Oct. 13, 1942 |
| 2,438,299 | Relis | Mar. 23, 1948 |
| 2,460,329 | Allen et al. | Feb. 1, 1949 |

FOREIGN PATENTS

| Number | Country | Date |
| --- | --- | --- |
| 13,588 | Great Britain | 1907 |